Dec. 28, 1948.  C. A. GIROD  2,457,458
SPEED DEVICE
Filed Nov. 27, 1945
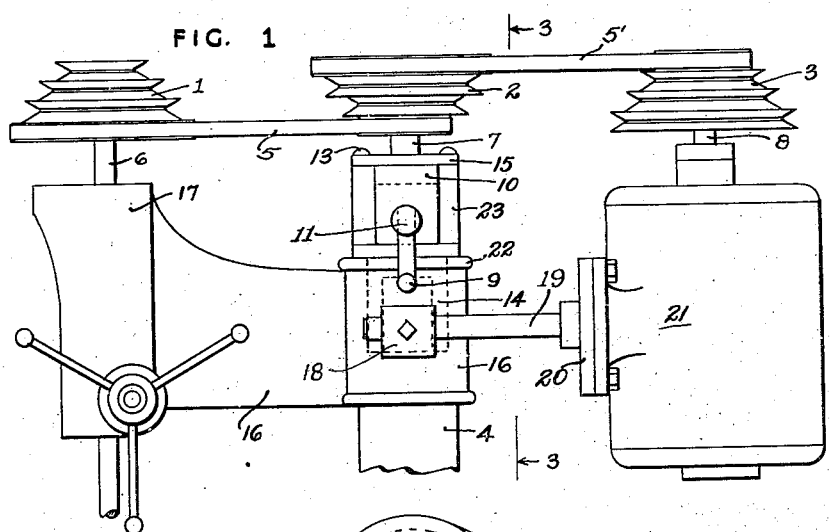
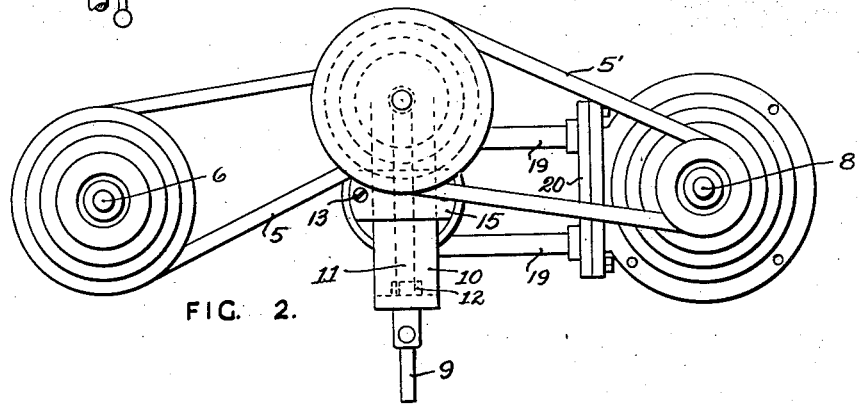
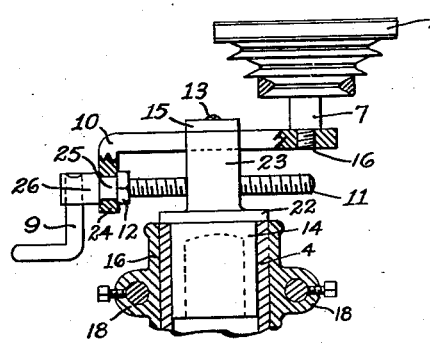
Inventor
CLYDE A. GIROD,
Attorneys Patented Dec. 28, 1948

2,457,458

UNITED STATES PATENT OFFICE 2,457,458

SPEED DEVICE

Clyde A. Girod, Winona, Minn.

Application November 27, 1945, Serial No. 631,201

4 Claims. (Cl. 74—242.1)

This invention relates to a crank for the speed device adapted to provide quick and ready variation of speed of drill presses, jig borers, and the like.

An object of the invention is to provide a relatively simple and inexpensive belt drive wherein the driven shaft or spindle may be driven at a multiplicity of speeds from a single speed motor.

Heretofore it has been quite customary to drive the spindle or driven shaft of a drill press or similar device from a single speed motor by employing cone or step pulleys on the driving shaft and driven shaft, respectively, and to secure various speeds by shifting the belt to the various steps on the pulleys. Such devices do not provide the range of speeds required for the various classes of work to which a drill press or similar device may be put, ranging from heavy metal work to woodworking. It is accordingly an object of my invention to provide a device capable of providing a wide range of spindle speeds from a single speed motor.

It is a further object of my invention to provide a simple and relatively inexpensive device for varying the relative speeds of a spindle and drive motor, by means of a device which shall be adjustable by simple turning of a crank, and without the necessity of tightening and loosening securing nuts.

Still a further object of the invention is to provide a speed varying means which may be secured to a conventional drill press simply and without the necessity for clamping the device to the drill press.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the upper portion of a drill press embodying the present invention;

Figure 2 is a top plan view of the same; and

Figure 3 is a vertical section taken substantially upon the line 3—3 of Figure 1, in the direction indicated.

Referring to the accompanying drawings wherein similar reference characters designate similar parts throughout, it will be understood that the present invention is not only applicable to a drill press but is equally applicable to a jig borer or other types of machine tools wherein it may be desirable to drive a driven shaft from a single speed motor or source of power at a multiplicity of different speeds. The drill press is merely used for illustrative purposes as one application of the invention.

Numeral 4 designates a supporting tubular column or pedestal of a drill press. Adjacent to the top of the column 4 is slidably secured a driving shaft support or hangar 16 otherwise known as the drill head. The drill head 16 is provided with an enlarged portion 17 which is suitably bored to receive the spindle 6 which has for its purpose to provide driving power for drilling, reaming, boring and the like. Suitably secured to spindle 6 is a cone or step pulley 1 which may be driven by belt 5. The structure so far described represents conventional structure of a drill press or similar device.

Integral with that portion of drill head 16 which is slidably secured to column 4 are two supporting bosses or lugs 18, which are drilled to adjustably receive supporting members or rods 19, the latter being locked in place by means of set screws. Rods 19 are secured to a plate 20 to which may be bolted a single speed drive motor 21, which provides the primary power for operating the drill press or similar device. Associated with drive motor 21 is a shaft 8 to which is secured, by any suitable and usual means, a cone or step pulley 3 which serves to drive a belt 5'.

The belt 5' drives an idler pulley 2 from which is driven the belt 5 which directly drives the spindle 6 of the drill press or similar device. It will now be obvious that by shifting the belts 5 and 5' among the various pulleys of the cones 1, 2, 3, a wide range of speeds may be attained. In order to provide for tightening of the belt 5, 5' in any selected arrangement thereof on the cones 1, 2, 3, means are provided, actuable by means of a crank 9, for adjusting pulley 2 to any selected position along a line bisecting at right angles a line joining pulleys 1 and 3.

For the purpose of adjustably moving pulley 2 in the desired manner, there is provided a cylindrical hollow stub 14 which is slidably insertable in hollow shaft 4 and which is provided with a shoulder 22 which rests upon the upper end of hollow shaft 4. Integral with hollow stub 14 is a short standard or pedestal 23, having at the upper end thereof a U-shaped slot in which is slidably mounted an L-shaped bar 10. Rectangular cover plate 15 covers the opening of the U-shaped slot by means of screws 13, thereby to secure the bar 10 within the slot.

A threaded hole is machined in the standard or pedestal 23 for receiving a screw 11, which extends through a hole 25 in the short leg 24 of L-shaped bar 10. The end of the screw 11 extending beyond the hole 25 of the leg 24 is provided with a head 26 which abuts against the complemental face of the leg 24. The leg 24 is held in abutting relation with respect to the head 26 by means of a nut 12.

Crank 9, which is suitably secured to head 26 of screw 11 serves as a convenient means for turning the screw 11. Upon rotation of screw 11 in the threaded hole in pedestal 23, translatory movement of the screw 11 relative to the pedestal 23 is accomplished, which motion is conveyed to the L-shaped bar 10 and thereby to the cone pulley 2, which idles on stub shaft 7, an end of which, 16, is threadably secured to the long leg of the L-shaped strap or bar 10.

It is now believed to be evident that whenever it is required to change the speed of the drill press spindle 6 relative to that of the motor shaft 8, that crank 9 may be turned to withdraw pulley 2 toward the imaginary line between shaft 8 and spindle 6, to loosen belts 5 and 5', and that after the belts have been adjusted on the proper sets of pulleys to provide the desired speed that the crank 9 may again be actuated in a proper direction to tighten the belts to provide proper traction.

From the above described construction it will be evident that a very simple but efficient crank for speed belt drive is secured which is readily applied to drill presses and similar devices, without clamps or bolts and which permits modification of spindle speeds by a readily effected operation involving no loosening of bolts or use of tools.

While the invention has been described in connection with a drill press, it will be appreciated that it is equally applicable to any type of construction wherein it is desirable to drive a driven shaft or spindle at a multiplicity of speeds from a single speed power source.

Various changes may be made in the details of construction without departing from the spirit or scope of the invention as defined by the appended claims.

What I claim is:

1. A crank for the speed belt drive for drill presses and the like comprising a drive pulley, a driven pulley, a speed change pulley, a first belt driving the speed change pulley from the drive pulley, a second belt for driving the driven pulley from the speed change pulley, a hollow column, means slidably mounted in the said hollow column and comprising a standard having a threaded hole diametrically therethrough, a screw rotatable in said threaded hole, a bar secured to said screw for translation therewith, and a stub shaft for said speed change pulley secured to said bar for translation therewith.

2. A crank for the speed belt drive for drill presses and the like having a head and a drive motor comprising a drive pulley, a driven pulley, an intermediate pulley, each of said pulleys comprising a plurality of steps, a belt for driving the intermediate pulley from said drive pulley, a belt for driving said driven pulley from said intermediate pulley, a column for supporting said head and said drive motor, said column being hollow in at least the upper portion thereof, a member slidably mountable on the upper hollow portion of said column and having a standard, an L-shaped bar, a U-shaped slot in said standard for slidably mounting said L-shaped bar, a stub shaft for said intermediate pulley secured to said bar, and means for causing translation of said bar in said U-shaped slot.

3. A crank for the variable speed belt drive for drill presses and the like comprising first, second and third pulleys, drive means for driving said first pulley from said second pulley and said second pulley from said third pulley, translatable means for translating said second pulley transversely of a line joining the first and third pulleys, a standard, a slot in said standard for slidably retaining said translatable means, a threaded hole in said standard, a screw means movable in said threaded hole, crank means for rotating said screw means, and means for causing translatory motion of said translatable means responsive to rotation of said screw means.

4. In a speed varying device for drill presses and the like, a hollow steel column, a drill head mounted on said column, an electric drive motor mounted on said column, support means having a downwardly oriented portion slidably inserted into said column and an upwardly oriented portion, a slot in said upwardly oriented portion, a screw device, a threaded aperture for said screw device in said upwardly oriented portion, an L-shaped bar having its long leg slidably mounted in said slot and having its short leg movably secured to said screw device to repeat translatory motion of said screw device, a crank for rotating said screw device, and a cone pulley secured to said long leg of said L-shaped bar.

CLYDE A. GIROD.

REFERENCES CITED

The following references are of record in the file of this patent:

UNITED STATES PATENTS

| Number | Name | Date |
|---|---|---|
| 1,173,189 | Hey | Feb. 29, 1916 |
| 1,388,876 | Mirrielees | Aug. 30, 1921 |
| 2,073,704 | Mitchell | Mar. 16, 1937 |
| 2,176,193 | Zwick | Oct. 17, 1939 |